United States Patent [19]

Rivinius et al.

[11] 4,423,560
[45] Jan. 3, 1984

[54] AUXILIARY SUPPORT FOR HEAVY EQUIPMENT

[76] Inventors: Theodore Rivinius, 810 N. Second St.; Emanuel Helm, both of Bismarck, N. Dak. 58501

[21] Appl. No.: 314,532

[22] Filed: Oct. 26, 1981

[51] Int. Cl.³ .............................................. B62D 57/02
[52] U.S. Cl. ...................................... 37/116; 180/8 C
[58] Field of Search .............. 180/8 R, 8 D, 8 C, 8 E; 37/116; 305/1, 2

[56] References Cited

U.S. PATENT DOCUMENTS

| | | | |
|---|---|---|---|
| 1,615,055 | 1/1927 | Turner | 180/8 C |
| 1,715,745 | 6/1929 | Edmondson | 180/8 C |
| 2,132,184 | 10/1938 | Poche | 180/8 C |
| 2,452,632 | 11/1948 | Cameron | 37/116 |
| 2,660,253 | 11/1953 | Davidson | 180/8 C |
| 2,914,127 | 11/1959 | Ricouard | 180/8 C |
| 2,942,676 | 6/1960 | Kraus | 180/8 C |
| 3,375,892 | 4/1968 | Kraschnewski et al. | 180/8 D |
| 3,446,301 | 5/1969 | Thomas | 180/8 C |
| 3,512,597 | 4/1970 | Baron | 180/8 C |
| 3,638,747 | 2/1972 | Althoff | 180/8 C |
| 4,252,204 | 2/1981 | Bishop | 180/8 C |

*Primary Examiner*—John A. Pekar
*Attorney, Agent, or Firm*—Kinney, Lange, Braddock, Westman and Fairbairn

[57] ABSTRACT

An improved walking mechanism for supporting and moving heavy equipment such as a strip mining drag line. The mechanism has a frame with a base pad attached to the frame for supporting the equipment on the ground. To move the equipment, a pair of conventional side pads are actuated with a crank arrangement to engage the ground and lift the base pad and frame off of the ground for stepping movement of the equipment horizontally with respect to the ground. The improvement comprises a cross pad positioned adjacent the forward or loaded end of the frame which is simultaneously actuated to engage the ground and provide partial support for the weight of the equipment when the side pads are actuated. The cross pad is pivotally connected to a force actuator, which in turn is pivotally connected to the frame. The force actuator is operated to extend and retract the cross pad horizontally and vertically between the frame and the ground.

6 Claims, 4 Drawing Figures

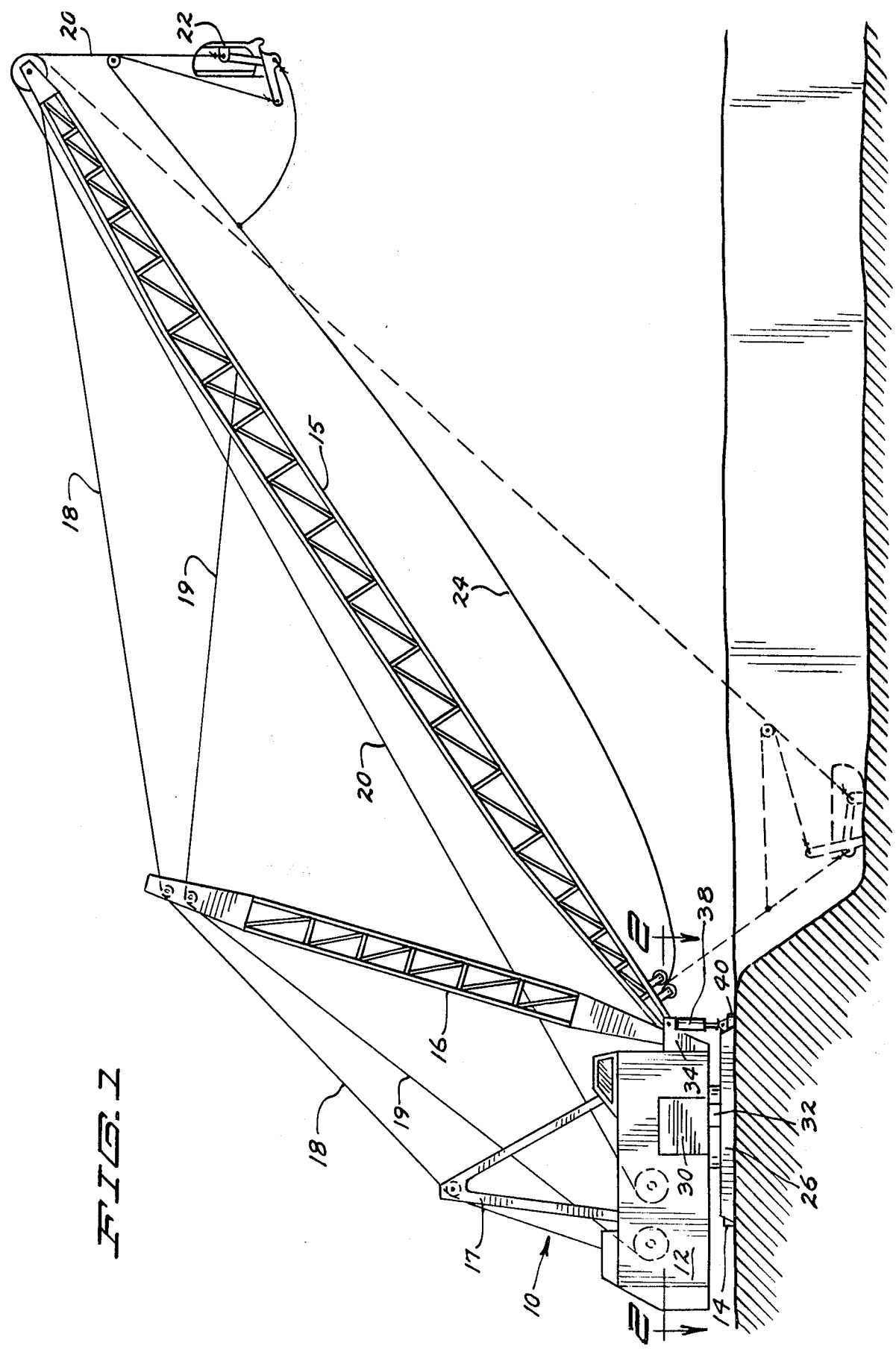

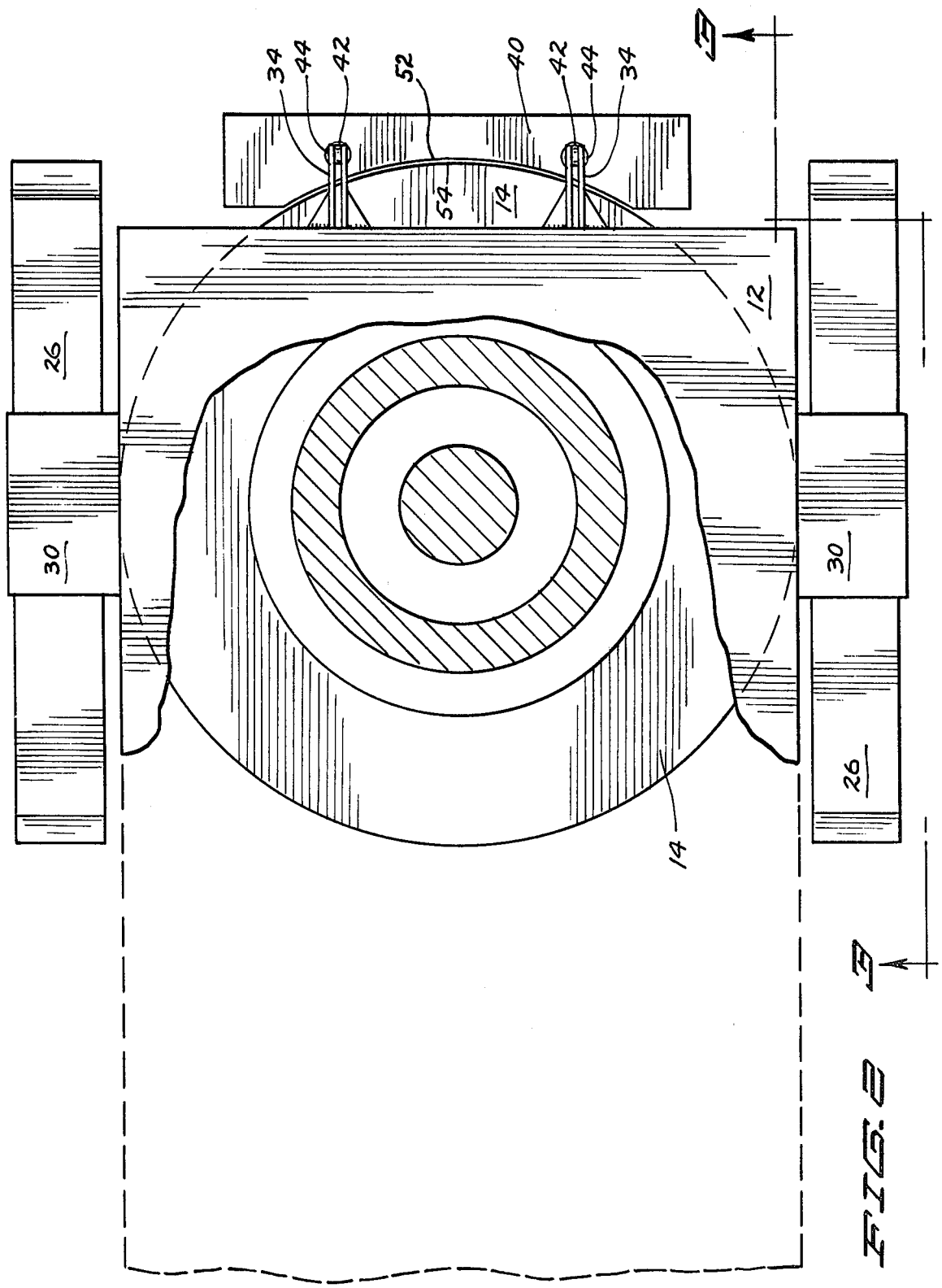

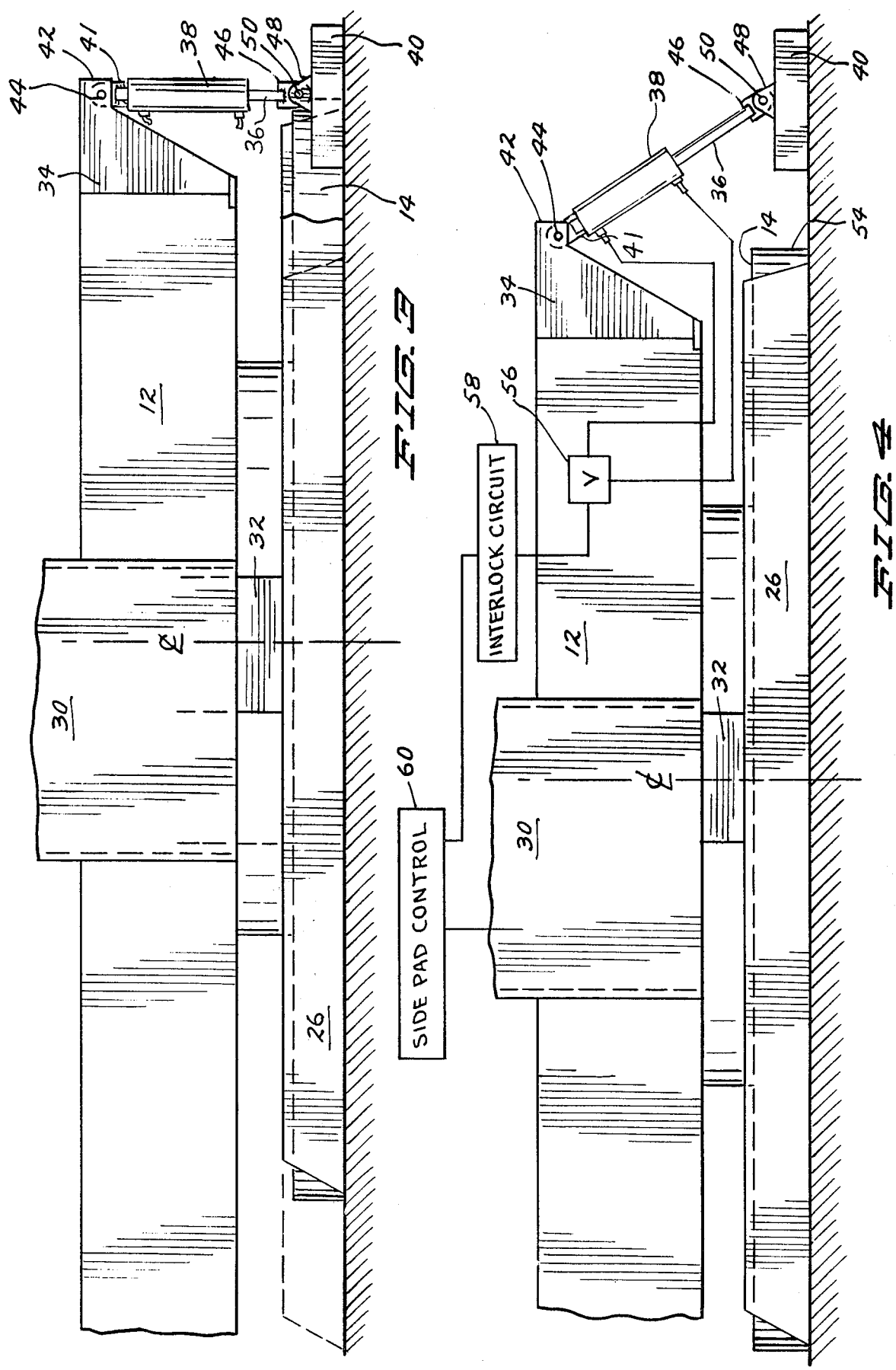

AUXILIARY SUPPORT FOR HEAVY EQUIPMENT

BACKGROUND OF THE INVENTION

1. Field of the Invention.

The present invention relates to walking mechanisms for the support and movement of heavy equipment, and more particularly to a device providing partial support and stabilization of the equipment during such movement.

2. Description of the Prior Art.

Walking or striding devices for moving heavy equipment, such as drag line excavators, are quite well known in the prior art. Variations of the prior art devices for moving such equipment are described in U.S. Pat. No. 3,512,597, U.S. Pat. No. 3,375,892, and U.S. Pat. No. 4,252,204. These patents show "stepping" devices which utilize elongated shoes or side pads which are engaged with the ground to lift and transport the equipment. In U.S. Pat. No. 4,252,204, a cam arrangement is used to actuate the shoes and lift the equipment, while in the other two patents mentioned, hydraulic systems are employed to achieve lifting and movement. In all three of these devices, the entire weight of the equipment is distributed among the two shoes or pads during the movement phase of their operation. U.S. Pat. No. 2,452,632 shows a similar device which employs four side pads instead of just two.

Hydraulic leveling and moving devices with six pads are shown in U.S. Pat. No. 1,615,055 and U.S. Pat. No. 2,660,253. Each device has two pads along each side and one pad at its forward end and one pad at its rearward end. Movement of the equipment mounted upon the device described by U.S. Pat. No. 1,615,055 is achieved by engaging the forward and rearward pads with the ground and rolling the equipment the length of the forward and rearward pads on wheels located on the top sides of those pads. Once the equipment has been moved to its desired location, the side pads are engaged with the ground to provide the primary means for support for the equipment's operation. The excavating machine moving device of U.S. Pat. No. 2,660,253 is quite similar in design and operation. At no time during the actual movement of the equipment by these two devices do the side pads provide a portion of the support for the weight of the equipment—either the four side pads or the forward and rearward pads carry the entire weight of the equipment alternately.

U.S. Pat. Nos. 2,942,676 and 3,638,747 show walking mechanisms for moving heavy loads employing three or more hydraulically operated legs or pads. In these two devices, the pads and their respective lifting and moving mechanisms are all actuated simultaneously to lift, support and move the load.

U.S. Pat. No. 1,715,745 shows a traction mechanism in which the actual moving devices are transverse to the unit at the fore and aft ends of the unit and which are operated mechanically. U.S. Pat. No. 3,446,301 shows a load moving striding device having a centrally mounted stride foot and a base frame which engages the ground to support the stride foot and load for movement.

A primary disadvantage of the prior art walking devices used to move heavy equipment such as excavating machinery is that the tub or base pad, upon which the equipment may rotate in operation, tends to tilt and drag at its trailing edge when the equipment is being lifted and moved. This is in part caused as the center of the cam shaft actuating the side pads and center of gravity of the machine are offset so the trailing edge of the tub drags. The side pads also tend to sink into the ground. During movement, the trailing edge of the base pad drags along the earth pushing a roll of dirt which builds up in a mound underneath the pad. This pack or mound of dirt creates significant difficulty in moving the equipment and the machines get stuck. The machines are mammoth and weigh in the range of seven million pounds. The drag line bucket may weigh seventy-five tons and lift another seventy-five tons of material.

Due to the tremendous weight of the equipment being moved, it is desirable to lift the equipment only to that extent necessary to permit efficient movement of the base pad on which the equipment rests. Therefore, a system is required which will maintain the trailing edge of the base pad (the end under the boom) generally level with the ground so that it does not dig into the earth. The mechanism of the present invention provides a simple, yet effective means for eliminating this pad-dragging problem.

SUMMARY OF THE INVENTION

The present invention relates to improving the efficiency and ease of a walking mechanism for heavy equipment such as drag lines. The improvement of the present invention eliminates the problem of earth or soil build up under the trailing edge of the base pad of such heavy equipment during movement. The invention provides partial support for the weight of the equipment to equalize the load and support the base pad properly so that it does not dig in or build up mounds of earth as the unit is moved.

In particular, the present invention is a cross pad attached to the frame of a walking mechanism for heavy equipment and positioned adjacent the trailing edge (with respect to the movement direction) of the base pad. Pivotally connected to both the cross pad and the frame is a force exerting device or actuator comprising a pair of double acting hydraulic cylinders. These hydraulic cylinders extend and retract under control between the cross pad and the frame to provide a vertical lifting force between the cross pad and frame which will support a portion of the machine weight on the ground.

In operation, the actuator is actuated to cooperate with the lifting of the base by the two side pads. Actuation of the actuator engages the cross pad with the ground and as the base is lifted by the side pads, the actuator extends urging the cross pad away from the frame in order to support part of the vehicle weight and keep the trailing edge of the base pad above the ground. As the equipment is moved, the frame and base of the equipment move horizontally away from the cross pad and the actuator is further extended to partially support and push the equipment. When the equipment has been moved the one step made with the side pads and the base pad has been lowered to the ground, the actuator is retracted so that the cross pad swings back to its original position relative to the base. The cross pad supports a portion of the weight of the equipment during the stepping movement and reduces the build up of soil underneath the trailing edge of the base.

BRIEF DESCRIPTION OF THE DRAWINGS

FIG. 1 is an side elevational view of an excavating machine of the drag line type equipped with side pads for moving the machine and employing a cross pad and actuator according to the present invention;

FIG. 2 is a fragmentary sectional top view taken as on line 2—2 in FIG. 1;

FIG. 3 is a partial side view taken as on line 3—3 in FIG. 2 showing the cross pad in a retracted position prior to the lifting of the base pad; and FIG. 4 is a partial side view of the machine of FIG. 3 showing the cross pad in an extended position after the base has been moved to its desired location.

DETAILED DESCRIPTION OF THE PREFERRED EMBODIMENTS

In FIG. 1, an excavating machine 10 of the drag line type is shown in its normal operating position. The excavating machine has a frame 12 that is mounted upon a circular tub or base pad 14 on which the major portion of the frame 12 is rotatably supported. A boom 15 has its inner end pivotally supported on the frame 12 and its outer end supported from jib 16 and mast arrangement 17 by means of cables 18 and 19 leading from a winch mechanism (not fully shown). A hoist cable 20 leading from another winch mechanism (not fully shown) passes around the outer end of boom 15 and is connected to an excavating bucket 22. A drag cable 24 is connected between the bucket 22 and a second winch mechanism (not shown) on frame 12. This overall arrangement is conventional and the various elements noted above will not be described in detail since they are well known to those skilled in the art. In addition, although an excavating machine of the drag line type is illustrated and discussed in this application, the present invention can be used with any large equipment to aid the movement of such equipment across the ground.

A pair of shoes or side pads 26,26 are disposed on opposite sides of the frame 12 and are actuated in a stepping fashion to move the machine forwardly (in direction away from the boom), to the left as seen in FIG. 1. Each side pad 26 is operated by a side pad power mechanism 30, such as cranks or cams, (see U.S. Pat. No. 4,252,204 for example) on frame 12. Each side pad is connected to its respective power mechanism by power link 32.

Extending from the boom end of the frame 12 are a pair of supports 34, 34. The relationship of these supports to the frame can best be seen in FIG. 2, which also shows the positioning of the side pads relative to the frame. Pivotally connected to the outer end of each support 34 is a means for exerting force, preferably the base of a separate double acting hydraulic actuator or lift cylinder 38 having a rod 36. Both cylinders 38 are in turn pivotally connected to a single cross pad 40. Each cylinder 38, which extends upwardly as seen in FIG. 3, is provided with an apertured mounting ear 41 which is received in a bifurcated, apertured bracket end 42 on the respective support 34. A pin 44 extends through the bracket end and ear and establishes a pivotal connection between the respective cylinder 38 and the support portion 34. Preferably a spherical ball connection is used to permit universal pivoting. The outer end of the rod 36 of the actuator or cylinder 38 is provided with an apertured mounting ear 46 which is received in a bifurcated, apertured bracket 48 fixed to the cross pad 40. A pin 50 extends through the bracket and ear and establishes a pivotal connection between the rod 36 and the cross pad 40. These connections also are preferably universally pivoting connections so the cross pad may move sideways slightly.

A top view of cross pad 40, as in FIG. 2, shows it to be generally rectangular in shape except for that portion of the cross pad 40 closest to the base pad 14. Inner side 52 of the cross pad 40 is cut out generally in an arc so that the cross pad 40 may be positioned adjacent trailing edge 54 (with respect to movement direction) of the base pad 14 as shown in FIG. 2. It should be noted that the cross pad 40, the side pads 26 and the other noted elements are all connected to the frame 12 above the base pad 14. The cross pad 40 can be lifted clear of the ground so it, along with the side pads 26, can turn with respect to the base pad 14 to allow the boom to swing during use. Drag lines of this type, which are used in strip mining usually are moved in a substantially straight path as they are moved to bring the bucket into position for a new excavation.

During operation, an excavating machine of the drag line type is generally positioned as shown in FIG. 1. The base pad supports the majority of the machine's weight as the drag bucket is pulled across the earth's surface, as shown generally by the dashed lines in FIG. 1. To move the machine to permit new excavation, the walking mechanism is employed. In operating the walking mechanism to move the machine to which it is attached, the side pads 26 are first raised by the side pad power mechanisms 30, moved forwardly (away from the boom) and then lowered into the position generally shown by the dashed lines in FIG. 3. The means for raising and moving the side pads 26 are generally known in the prior art and will not be described in detail. Generally, these raising and moving mechanisms are large cam shafts or crank shafts that are rotated under power. Once the side pads 26 have been moved to this forward lowered position, the power mechanisms 30 provide the force to lift the machine off of the ground.

The lifting of the base pad 14 and the machine off of the ground is enhanced by the cooperation of both the side pads 26 and the cross pad 40. As the power mechanisms 30 apply the power to the side pads 26 to lift the base pad 14, the hydraulic cylinders 38 connecting the cross pad 40 and the frame 12 are also actuated by a valve 56, either manually or through a suitable interlock circuit 58 to extend and force the cross pad 40 against the ground to tend to support and lift the frame 12 and trailing edge of the base pad 14 off of the ground. The force from cylinders 38 keeps the base generally horizontal and prevents the trailing edge 54 from dragging or digging in as the power mechanisms 30 of the side pads 26 move the frame 12 forwardly (to the left in FIGS. 3 and 4). Simultaneously, the rods of the hydraulic cylinders 38 connecting the cross pad 40 and the frame 12 are further extended in order to support the trailing edge 54 of the base pad 14 off of the ground for the entire distance of the lateral movement of the machine. After traversing the entire stepped distance, the base pad 14 is again lowered to the ground by the side pad power mechanisms 30. At this point, the hydraulic cylinders 38 between the cross pad 40 and the frame 12 are extended as shown in FIG. 4 and the valve 56 can be operated to start to retract the cylinders 38. Once the excavating machine has settled its weight back onto the base pad 14, the need for additional support by the hydraulic cylinders 38 and cross pad 40 is no longer necessary. Thus, the hydraulic cylinders 38 are retracted fully causing the cross pad 40 to be lifted off the ground to swing back under the support portions 34 adjacent the trailing edge 54 of the base pad 14, similar to a pendulum, as shown in FIG. 2. The elements of the walking mechanism are now generally in a position shown in FIG. 3, and are ready to begin further movement of the machine or to allow the machine to resume excavating operations. The cross pad 40 is lifted entirely off the ground so that the boom may be swung for operation.

Certain portions of the walking mechanism have been omitted or shown schematically for the sake of simplicity and clarity. Thus, for example, the interlock system may be any suitable circuit that is activated when the side pads are operated, and with a force feedback signal from the cylinders 38 used with a typical servo control system, the amount of force exerted by the cylinders can be controlled. If desired, the valve 56 may be a manual valve and relief valves can be provided to limit or control the pressure in the cylinders and thus the force exerted by the cylinders. It should also be noted that the cylinders can be operated in parallel if desired.

Various electrical and hydraulic safeguards might also be added. It will, of course, be advisable to program the systems and circuits such that the side pads operate simultaneously and in conjunction with the cross pad mechanisms.

What is claimed is:

1. In a walking mechanism for heavy equipment, the combination comprising:
   a frame;
   a base pad attached to the frame for supporting the equipment on the ground;
   means for lifting the base pad and frame off of the ground and to provide movement of the equipment horizontally with respect to the ground; the improvement comprising:
   a cross pad positioned exterior to the base pad and adjacent an end of the frame opposite from the direction of movement;
   means pivotally connected to both the frame and the cross pad for exerting force tending to separate the frame and the cross pad; and
   the cross pad being selectively engageable with the ground for supporting a portion of the weight of the frame and base pad at the same time as weight is supported by the means for lifting.

2. The mechanism of claim 1 wherein the means for exerting force comprises at least one double acting hydraulic cylinder.

3. The mechanism of claim 2 wherein the means for exerting force is pivotally connected to the frame and the cross pad by a spherical ball connection to permit universal pivoting.

4. The mechanism of claim 3 wherein the walking mechanism is an excavating machine of the drag line type having a boom at one end of the frame, the cross pad being positioned proximate that end of the frame having the boom.

5. The mechanism of claim 1 wherein the means for lifting comprise support pads along the sides of the frame and means to drive said pads in a stepping action, and means to synchronize the movement of the means for lifting and the means for exerting force.

6. The mechanism of claim 2 including valve means for operating the hydraulic cylinders to support a desired portion of the weight of the heavy equipment.

* * * * *